C. J. MELLIN.
POWER TRANSMISSION MECHANISM.
APPLICATION FILED MAY 15, 1912.
1,062,985.
Patented May 27, 1913.
5 SHEETS—SHEET 2.
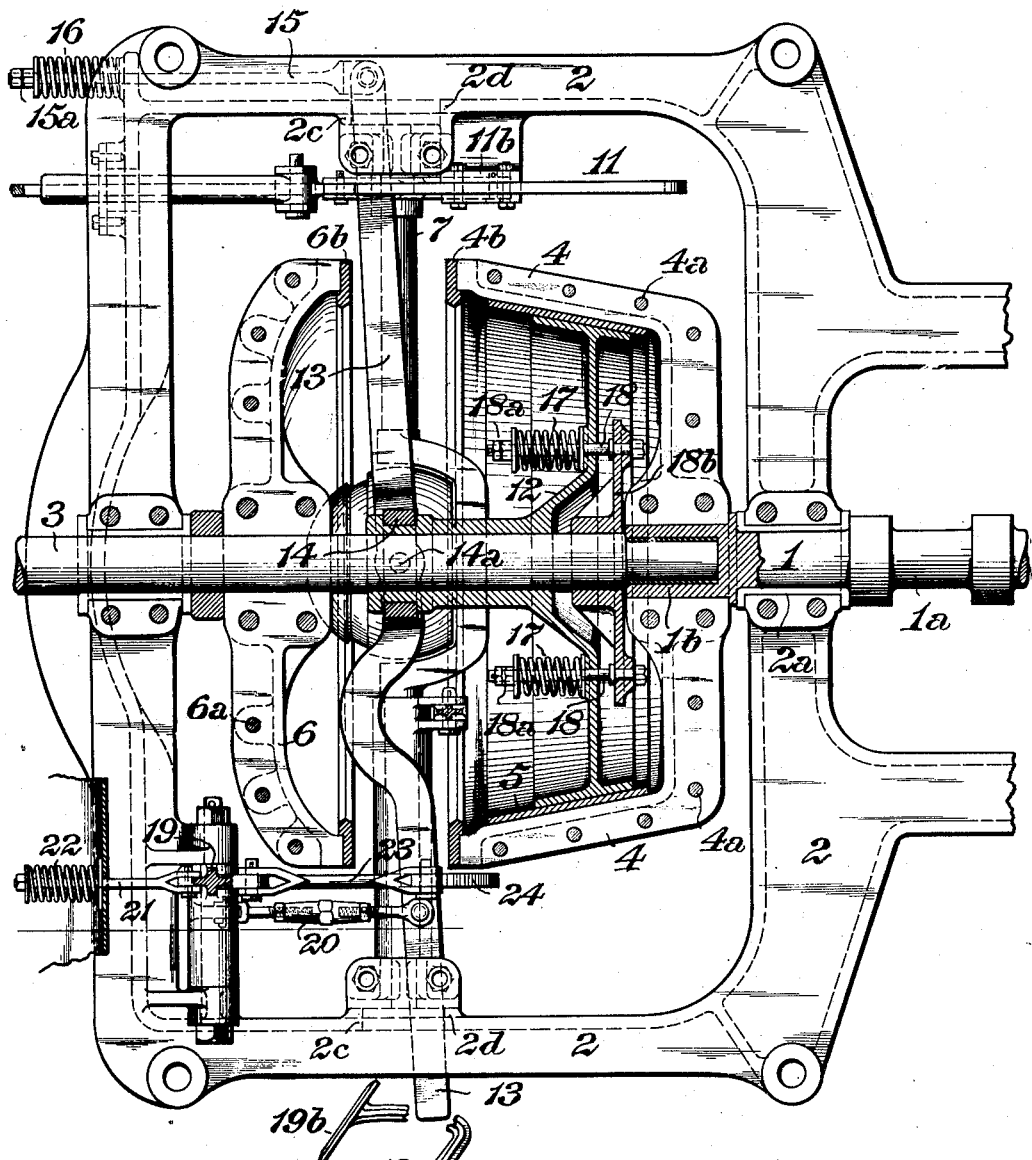
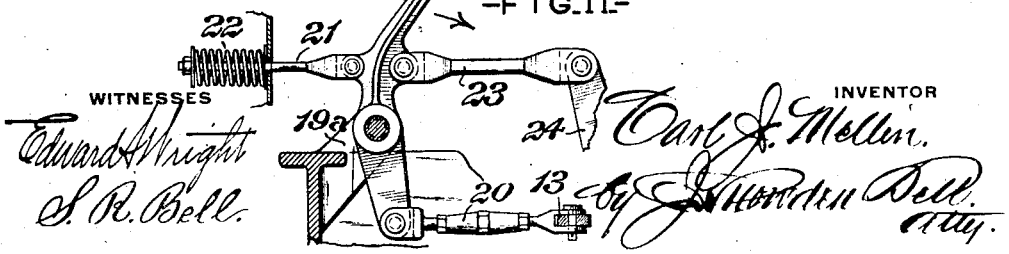

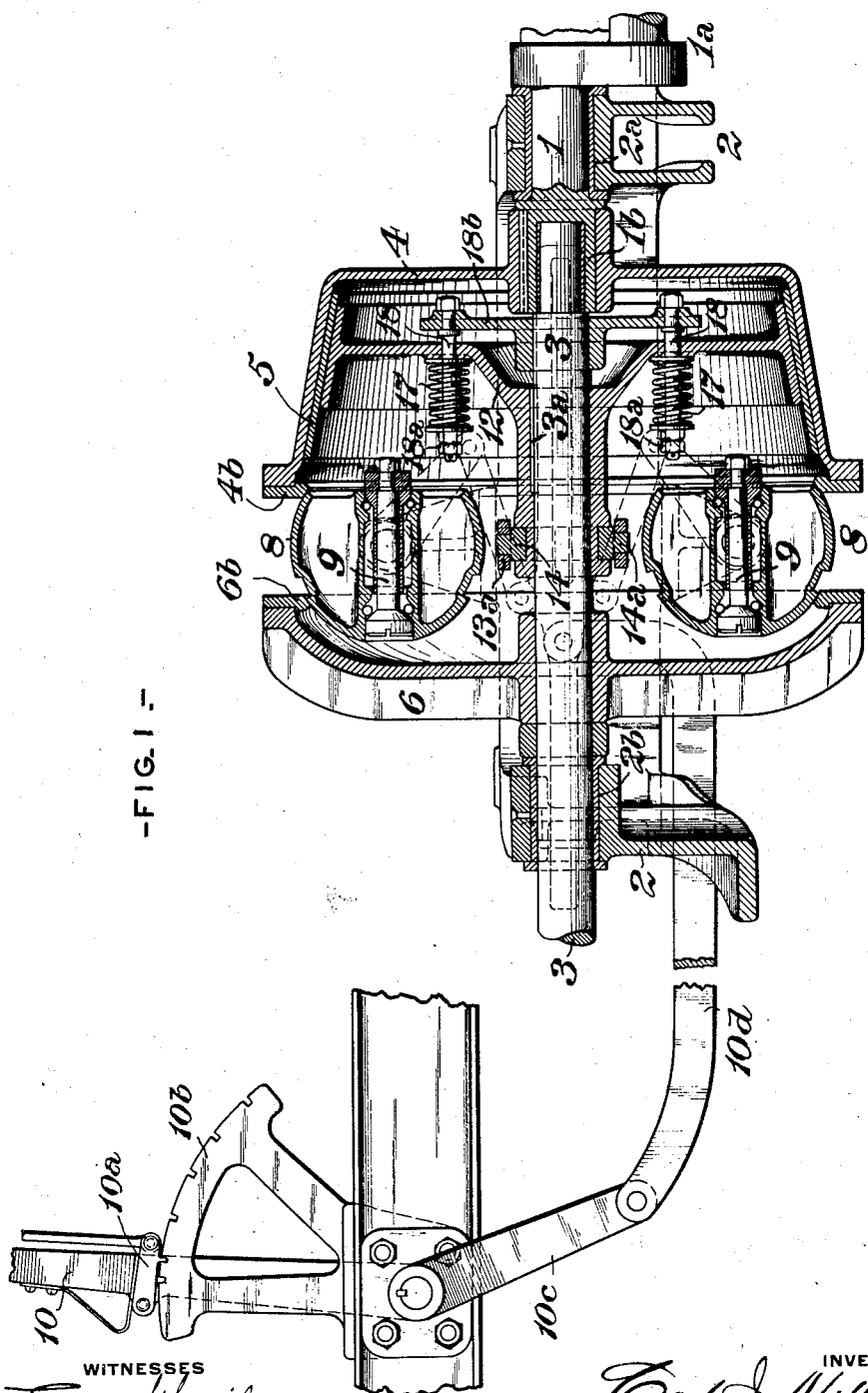

C. J. MELLIN.
POWER TRANSMISSION MECHANISM.
APPLICATION FILED MAY 15, 1912.
1,062,985.
Patented May 27, 1913.
5 SHEETS—SHEET 3.
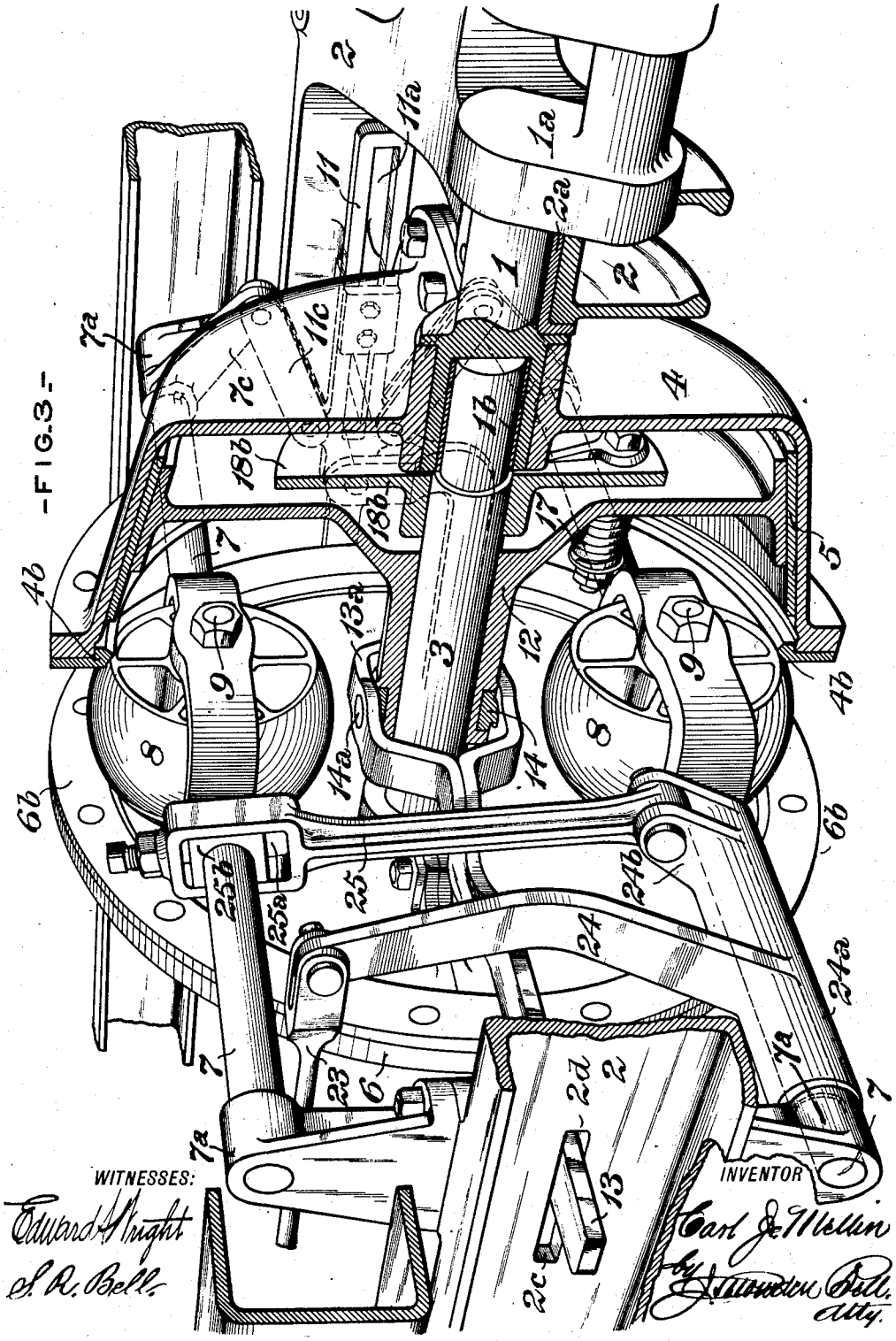

C. J. MELLIN.
POWER TRANSMISSION MECHANISM.
APPLICATION FILED MAY 15, 1912.
1,062,985.
Patented May 27, 1913.
5 SHEETS—SHEET 4.
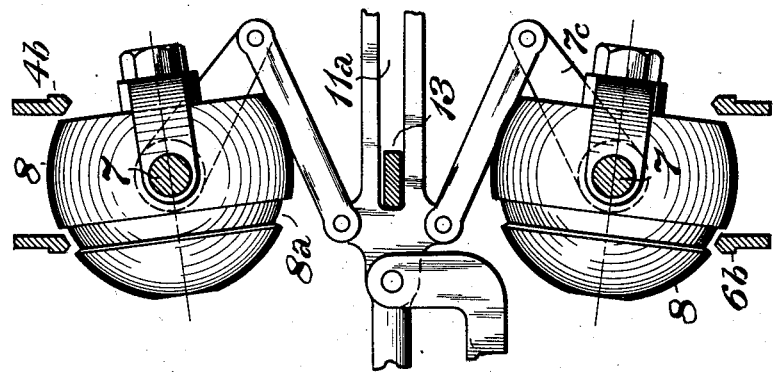
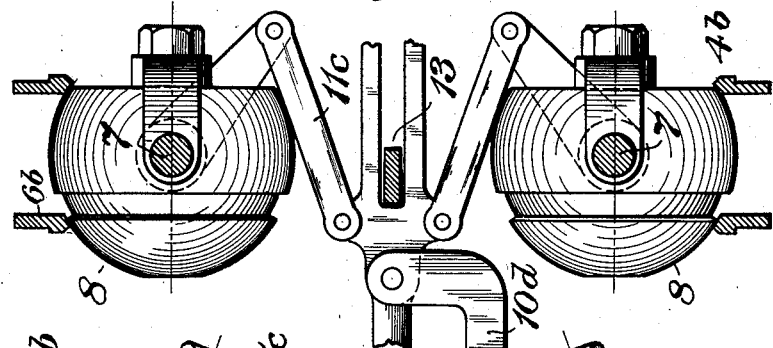
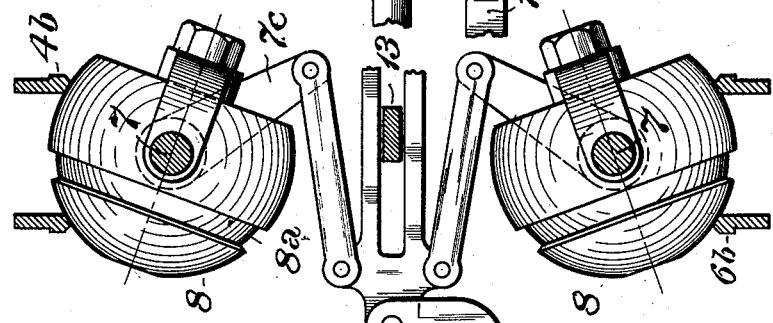
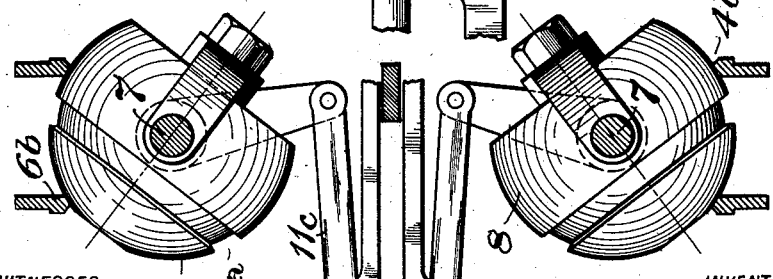
WITNESSES:
Edward H. Wright
S. R. Bell
INVENTOR
Carl J. Mellin,
by Snowden Bell
atty.

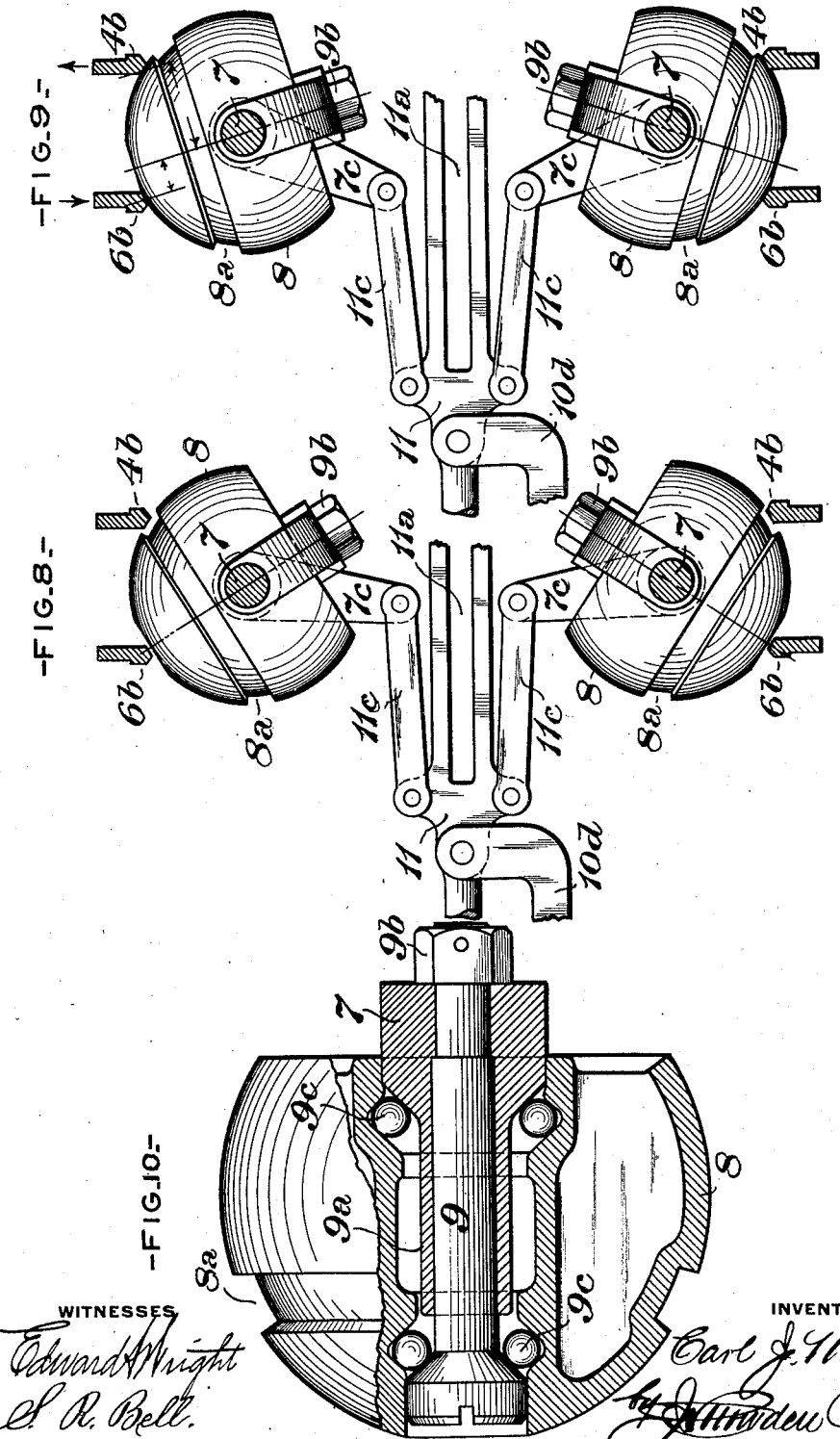

UNITED STATES PATENT OFFICE.

CARL J. MELLIN, OF SCHENECTADY, NEW YORK.

POWER-TRANSMISSION MECHANISM.

1,062,985.  Specification of Letters Patent.  Patented May 27, 1913.

Application filed May 15, 1912. Serial No. 697,378.

*To all whom it may concern:*

Be it known that I, CARL J. MELLIN, of Schenectady, in the county of Schenectady and State of New York, have invented a certain new and useful Improvement in Power-Transmission Mechanism, of which improvement the following is a specification.

The object of my invention is to provide simple and effective means whereby the rotation of a power actuated driving shaft may, through frictional contact, be transmitted to a driven shaft, with the capacity of variation of the speed and direction of rotation of the driven shaft, or the cessation of the transmission of rotation thereto, as may, from time to time, be desired.

The improvement claimed is hereinafter fully set forth.

In the accompanying drawings: Figure 1 is a vertical, longitudinal, central section through a power transmission mechanism, illustrating an application of my invention; Fig. 2, a plan view, partly in horizontal longitudinal central section, of the same; Fig. 3, a perspective view, partly in vertical longitudinal section; Figs. 4 to 9 inclusive, views, showing, respectively, different positions of the ball members; Fig. 10, a view, partly in elevation and partly in longitudinal central section, and on an enlarged scale, of a ball member, detached; and Fig. 11, a view, in elevation, of a foot lever and its connections.

My invention is herein exemplified as applied for the transmission of rotation from a driving shaft, 1, which is journaled in bearings, $2^a$, on a frame, 2, and actuated by power applied to a crank, $1^a$, formed or fixed upon it adjacent to one of its bearings, to a driven shaft, 3, which is mounted, in line axially with the driving shaft, in a bearing, $1^b$, in one end thereof, and in a bearing, $2^b$, on the frame. A driving drum, 4, which is made in two halves, connected by bolts, $4^a$, is secured upon the end of the driving shaft, 1, adjacent to the driven shaft, 3, the rim of the driving drum being in the form of a frustum of a cone, the larger diameter of which is at the end of the rim farther from the hub of the drum. A sleeve or bushing, 5, corresponding in form with the rim of the drum, is secured therein, said bushing being provided for the purpose of furnishing a bearing surface for a sliding friction clutch hereinafter described, and a frictional driving ring or facing, $4^b$, the inner surface of which is preferably, though not necessarily, in the form of a segment of a sphere, is secured to the larger end of the rim of the driving drum.

A driven disk, 6, which, similarly to the driving drum, 4, is made in two halves, connected by bolts, $6^a$, is secured upon the driven shaft, 3, said disk having a driven ring or facing, $6^b$, secured to its rim. The facing, $6^b$, is similar in diameter to the facing, $4^b$, and its inner surface is, similarly to that of the latter, preferably in the form of a segment of a sphere. The facings, $4^b$ and $6^b$, are located at such distance apart, in the direction of the length of the driven shaft, 3, as to permit of the interposition between their inner surfaces, of portions of the peripheries of two rotatable ball members, 8, by the frictional contact of which with the facings, $4^b$ and $6^b$, rotation is transmitted from the driving shaft, 1, and driving drum, 4, to the driven disk, 6, and the driven shaft, 3, upon which it is secured. The construction of the ball members, and the means whereby the relation of their surfaces to those of the facings, $4^b$ and $6^b$, are varied as desired, to vary the speed of the driven shaft, to change its direction of rotation, or to effect a cessation of the transmission of rotation to it, respectively, will now be described.

Two carrier shafts, 7, 7, are journaled in bearings, $7^a$, $7^a$, on the frame, 2, at right angles to the driven shaft, 3, and at equal distances therefrom, each of said shafts being made of rectangular section and turned outwardly in U form at the middle of its length, to pass around a ball member, 8, which is journaled on a pin, 9, said pin being inclosed, throughout the major portion of its length, by a sleeve, $9^a$, and being secured in the shaft, 7, in the axial plane of the driven shaft, 3, by a nut, $9^b$, engaging a thread on its end adjacent to the shaft, 7. The ball members, 8, are in the form of segments of spheres, each having a peripheral groove or recess, $8^a$, in a plane at right angles to the pin, 9, on which the ball member is fitted, and they bear on the pins, 9, and sleeves, $9^a$, through the intermediation of interposed bearing balls, $9^c$. The carrier shafts are set at such a distance apart as to enable the spherical surfaces of the ball members to be brought into contact with the inner surfaces of the facings, 4ᵇ and 6ᵇ, of the driving drum, 4, and driven disks, 6, respectively, the diametral relation of the surfaces of the ball members, taken from the axes of the pins, 9, to those of said facings, being variable by movements of the carrier shafts, 7, about their axes, as indicated in Figs. 4 to 9 inclusive.

The carrier shafts, 7, 7, are swung in their bearings, to vary the relation of the axes of the pins, 9, to the common axes of the driving and driven shafts, 1, and 3, by a hand lever, 10, journaled on the frame and having pivoted to it a latch, 10ᵃ, adapted to engage any of a plurality of notches in a fixed segment, 10ᵇ, for the purpose of holding the hand lever in any adjusted position. The hand lever carries an arm, 10ᶜ, projecting downwardly below its bearing, and the lower end of said arm is coupled to a link, 10ᵈ, the opposite end of which is, in turn, coupled to a shifting bar, 11, in which is formed a longitudinal slot, 11ᵃ, and which is fitted to slide longitudinally, parallel with the driving and driven shafts, in a bearing, 11ᵇ, fixed on the frame. The bar, 11, is coupled, by links, 11ᶜ, to arms, 7ᶜ, on the carrier shafts, 7, so that by its longitudinal movements, as actuated by the hand lever, 10, said shafts may be swung in their bearings and the angles of the axes of the pins, 9, on which the ball members rotate, be varied relatively to the axis of the driving and driven shafts, to vary the speed of rotation or direction of rotation of the driven shaft, as from time to time desired.

As shown in Figs. 1, 3, and 6, the axes of the pins, 9, are parallel with the axes of the driving shafts, and the contact surfaces of the ball members, 8, with the facings, 4ᵇ, of the driving drum, and 6ᵇ, of the driven disk, are in transverse planes of the ball members, at right angles to their axes, and of equal diameters. The hand lever is then in the position shown in Fig. 1. With the parts in these positions, rotation imparted to the ball members by their frictional contact with the facing, 4ᵇ, of the driving drum, will be transmitted, at the same speed, to the driven disk and driven shaft, by their frictional contact with the facing, 6ᵇ, of the driven disk. When the axes of the ball members are moved into the positions indicated in Figs. 4 and 5, the surfaces of contact of the ball members with the facing of the driving drum are in transverse planes, at right angles to their axes, of greater diameter than their parallel planes of contact with the facing of the driven disk. The speed of the driven shaft will consequently be reduced, relatively to that of the driving shaft, the reduction of speed being greater proportionately to the increase of angularity of the axes of the ball members to the axis of the driving and driven shafts, and therefore greater in the positions shown in Fig. 4 than in those shown in Fig. 5. As shown in Fig. 7, the ball members have been moved into positions in which their peripheral grooves, 8ᵃ, are opposite the facing of the driven wheel, and their surfaces are also entirely clear of the facing of the driving drum. It will be seen that when in such position, there will be no transmission of rotation from the driving drum to the driven disk, and the same is the case when the ball members are in the positions shown in Fig. 8. The corresponding movements of the carrier shafts in the opposite direction will correspondingly vary the speed of rotation of the driven shaft, and will also, in each case, effect its rotation in the opposite direction. Fig. 9 shows the parts in position for a reduction of speed of the driven shaft and its rotation in opposite direction to that resultant upon their adjustment in the positions of Figs. 1 and 3 to 6 inclusive.

In the specific embodiment of my invention herein set forth, I provide, in connection with the ball transmission mechanism above described, a friction clutch mechanism, by means of which, rotation, at the maximum speed of the driving shaft, may be imparted to the driven shaft, when the ball members are moved into position to be inoperative; the relation of the two mechanisms being such that the clutch mechanism will be operative when, and only when, the ball members are out of contact with the facings of the driving drum and driven disk, as will appear from the following description.

A friction clutch, 12, is fitted to slide longitudinally on a key, 3ᵃ, on the driven shaft, 3, said clutch having a rim corresponding in form with the bushing, 5, of the driving drum, and adapted to be moved into and out of contact therewith. A floating lever, 13, which is located substantially at right angles to the driven shaft, is journaled on pivots, 14ᵃ, fixed to a ring, 14, fitting in a circumferential groove in the hub of the clutch, 12, the pivots, 14ᵃ, fitting in a central yoke or eye, 13ᵃ, in the floating lever. The end portions of the floating lever pass through slots in the frame, 2, the length of said slots being such as to permit a limited degree of swinging movement of the floating lever on its pivots, and the ends of the slots forming stops, 2ᶜ, 2ᵈ, for said lever. The floating lever passes freely through the longitudinal slot, 11ᵃ, of the shifting bar, 11, and its end adjacent thereto is coupled, by a link, 15, to a spring, 16, the tension of which may be adjusted by nuts, 15ᵃ, engaging a thread on the link, 15. The spring, 16, holds the floating lever in the position shown in Fig. 2, in which the rim of the clutch, 12, is out of contact with the bushing, 5, of the driving drum, at all times except when compressed by the pressure of the inner end of the longitudinal slot of the shifting bar, 11, on the floating lever, when the full speed of the driving shaft is desired to be transmitted to the driven shaft, and when, for that purpose, said bar is moved by the hand lever into position to move the ball members out of contact with the facings, 4ᵇ, and 6ᵇ, as indicated in Fig. 7. The clutch, 12, is held in frictional contact with the bushings, 5, of the driving drum, when the floating lever is moved in direction to make contact of the clutch with the bushing, by springs, 17, bearing on the clutch and on rods, 18, fixed in a disk, 18ᵇ, which is keyed on the driven shaft, 3. The tension of the springs, 17, may be adjusted by nuts, 18ᵃ, engaging threads on the rods, 18. The clutch, 12, is released from frictional contact with the bushing, 5, of the driving drum, and pressure is exerted on the ball members, 8, by which they are applied with increased force to the facings, 4ᵇ, and 6ᵇ, by a double armed foot lever, 19, journaled in bearings, 19ᵃ, on the frame, and having a treadle, 19ᵇ, on its upper arm, the lower arm of said lever being coupled, by a tension rod, 20, to the floating lever, 13. The upper arm of the foot lever is coupled, by a link, 21, to a spring, 22, bearing on the frame and tending to hold the foot lever normally in the position shown in Figs. 2 and 11, in which the clutch is in frictional contact with the driving drum, when the hand lever is at the extreme left end of the segment in full gear position. The upper arm of the foot lever is also coupled, by an alternating tension and compression rod, 23, to a lever arm, 24, on a sleeve, 24ᵃ, journaled on one of the carrier shafts, 7, said sleeve being provided with a short arm, 24ᵇ, to which is coupled one end of a link, 25. The opposite end of the link, 25, is provided with a longitudinal slot, 25ᵃ, in which is fitted a block, 25ᵇ, fitting around the opposite carrier shaft, 7, and the arm, 24ᵇ, and link, 25, are coupled at an angle, so as to operate with a toggle joint action, and exert pressure upon the carrier shafts by which the ball members are pressed against the facings of the disks. While the floating lever, 13, is capable of movement at all times by the foot lever, through its limited range between the frame stops, 2ᶜ, 2ᵈ, it does not allow the clutch to be brought into frictional contact with the driving drum, except when the hand lever is in full gear position, that is with its latch engaged with the notch on the left hand end of its segment. The springs, 17, also serve as compression springs for the ball members, through the medium of the foot lever, when the hand lever is not in full gear position, and the spring, 22, acts similarly and is adjustable to exert proper tension on the ball members. By means of this construction, it will now be observed that the foot lever and its connections serve the purpose of connecting and disconnecting the driving and driven shafts at the will of the operator, both when the power is being transmitted through the frictional ball members and also when driving directly through the clutch device. When the hand lever occupies any of its operative positions in which the ball members engage the facings of the disks, as shown in Figs. 4, 5, 6, and 9, the ball members may be withdrawn from contact with the facings of the disks by simply pressing down the foot lever, 19, in the direction indicated by the arrow in Fig. 11, which movement, operating through the rod, 23, lever, 24, sleeve, 24ᵃ, and link, 25, deflects the carrier shafts, 7, toward each other, and releases the ball members from engagement with the facings of the disks. Upon removing pressure from the foot lever, the springs, 22, and, 17, act to return the parts to normal operative position, in which the toggle connection of the arm, 24ᵇ, and link, 25, serves to force the carrier shafts outward, and the ball members into engagement with the facings of the disks. The force with which the ball members are held against the facings may be increased or diminished by varying the pressure exerted upon the foot lever, or by adjusting the tension of the springs, 22, and, 17. If the hand lever is in its full gear position with the clutch in and the ball members out of operation, the same movement of the foot lever operates through the rod, 20, to turn the floating lever, 13, to the left, and withdraw the clutch, 12, from frictional engagement with the bushing, 5, thereby disconnecting the shafts. The springs, 17, and 22, serve to throw the clutch into operation again when pressure is removed from the foot lever. When it is desired to change from one speed to another or to shift the hand lever either to or from the full gear position, the foot lever may be pressed down momentarily, to disconnect the shafts during each shifting movement, and thereby relieve any strain upon the mechanism.

The essential operative principle of my invention may, within the ordinary skill of those familiar with the art to which it relates, be applied in the transmission of power, under various structural modifications of the specific embodiment of the invention which is herein exemplified, and I do not, therefore, limit myself to said specific embodiment, believing my invention to include such structural modifications as embody its essential and characteristic features, substantially as herein set forth.

I claim as my invention and desire to secure by Letters Patent:

1. In a power transmission mechanism, the combination of a driving shaft, a driven shaft, friction wheels on said shafts, an interposed rotatable ball member through which rotation is imparted from the driving shaft to the driven shaft by frictional contact, and means for varying the direction of rotation of the driven shaft by variations of the axial angular relation of the ball member thereto.

2. In a power transmission mechanism, the combination of a driving shaft, a driven shaft, friction wheels on said shafts provided with internal friction surfaces on their rims, an interposed rotatable ball member adapted to contact with said friction surfaces, an axle on which said ball member is journaled, a carrier shaft extending at right angles to the axle of the ball member and secured thereto, an arm fixed to said carrier shaft, and operative connections for turning said arm and shaft to move the ball member into and out of different desired relative planes of contact with the surfaces of the friction wheels.

3. In a power transmission mechanism, the combination of a driving shaft, a driven shaft, friction wheels on said shafts, an interposed rotatable ball member in the form of a segment of a sphere having a peripheral groove in a plane at right angles to its axis of rotation, an axle on which said ball member is journaled, and means for moving the ball member at right angles to its axis of rotation and thereby to bring it into contact with the friction wheels in different desired radial planes at right angles to said axis, or to move it into position in which its peripheral groove registers with one of the friction wheels and its surface is removed from contact with the other.

4. In a power transmission mechanism, the combination of a driving shaft, a driven shaft, friction wheels on said shafts, two rotatable ball members journaled on axles on opposite sides of the axes of the friction wheels, and means for coincidently moving said ball members at right angles to their axes of rotation and thereby bringing their surfaces into and out of frictional contact, in different desired relative transverse planes of the ball members, with the rims of the friction wheels.

5. In a power transmission mechanism, the combination of a driving shaft, a driven shaft, friction wheels on said shafts, two rotatable ball members journaled on axles on opposite sides of the axes of the friction wheels, in position to contact with said wheels, two carrier shafts journaled in bearings at right angles to the axles of the ball members, and each secured to one of said axles, a shifting bar fitted to slide longitudinally at right angles to the carrier shafts, links coupling said shifting bar to said shafts, and operative connections for actuating the shifting bar.

6. In a power transmission mechanism, the combination of a driving shaft, a driven shaft, friction wheels on said shafts, two rotatable ball members journaled on axles on opposite sides of the axes of the friction wheels, in position to contact with said wheels, two carrier shafts journaled in bearings at right angles to the axles of the ball members and each secured to one of said axles, and means for exerting pressure on the carrier shafts to force the ball members into engagement with the friction wheels.

7. In a power transmission mechanism, the combination of a driving shaft, a driven shaft, friction wheels on said shafts, two rotatable ball members journaled on axles on opposite sides of the axes of the friction wheels, in position to contact with said wheels, two carrier shafts journaled in bearings at right angles to the axles of the ball members, a sleeve journaled on one of said shafts, a toggle joint link connection coupling said sleeve with the other shaft, and means for moving the sleeve about its axis and thereby applying pressure to the shafts and ball members through the toggle joint link connection.

8. In a power transmission mechanism, the combination of a driving shaft, a driven shaft, a friction wheel fixed on one of said shafts, a clutch sliding on the shaft carrying said friction wheel, a friction wheel fixed on the other shaft and adapted to be engaged by said clutch, a rotatable ball member interposed between said friction wheels, means for moving said ball member into and out of frictional contact with said friction wheels, and means for moving the clutch into engagement with one of the friction wheels, when and only when the ball member is moved out of contact with the friction wheels, and out of engagement when the ball member is brought in contact with said wheels.

9. In a power transmission mechanism, the combination of a driving shaft, a driven shaft, a friction wheel fixed on one of said shafts, a clutch sliding on the shaft carrying said friction wheel, a friction wheel fixed on the other shaft and adapted to be engaged by said clutch, a rotatable ball member interposed between said friction wheels, a floating lever coupled to the clutch and operable to effect its engagement with and disengagement from one of the friction wheels, a spring which normally holds the floating lever and clutch in the disengaged position of the latter; and a shifting bar coupled to the support of the ball member, for moving the same into and out of frictional contact with the friction wheels, said shifting bar engaging the floating lever, and moving it in direction to engage the clutch with one of the friction wheels, when and only when it has moved the ball members out of contact with the friction wheels.

10. In a power transmission mechanism, the combination of a driving shaft, a driven shaft, a friction wheel fixed on one of said shafts, a clutch sliding on the shaft carrying said friction wheel, a friction wheel fixed on the other shaft and adapted to be engaged by said clutch, a rotatable ball member interposed between said friction wheels, a floating lever coupled to the clutch and operable to effect its engagement with and disengagement from one of the friction wheels, a spring which normally holds the friction lever and clutch in the disengaged position of the latter, a shifting bar coupled to the support of the ball member for moving said ball member into and out of contact with the friction wheels, and engaging the floating lever when the ball member is out of contact with said wheels, a lever coupled to the floating lever and operable to move said floating lever in direction to engage the clutch with one of the friction wheels, and a spring normally holding said coupled lever and floating lever in position in which the clutch is disengaged from the friction wheels.

11. In a power transmission mechanism, the combination of a driving shaft, a driven shaft, friction wheels on said shafts, an interposed rotatable ball member through which rotation is imparted from one shaft to the other by frictional contact, means for shifting the ball member to change the speed, and adjustable spring mechanism for normally holding the ball member in frictional engagement.

12. In a power transmission mechanism, the combination of a driving shaft, a driven shaft, friction wheels on said shafts, an interposed rotatable ball member through which rotation is imparted from one shaft to the other by frictional contact, means for shifting the ball member to change the speed, spring mechanism for normally holding the ball member in frictional engagement, and manually operative means for withdrawing the ball member from said frictional engagement.

13. In a power transmission mechanism, the combination of a driving shaft, a driven shaft, friction wheels on said shafts, an interposed rotatable ball member through which rotation is imparted from one shaft to the other at certain times, a clutch for connecting the shafts directly together at other times, and manually operative means for withdrawing the ball member from frictional engagement at certain times, and for throwing the clutch out of engagement at other times.

14. In a power transmission mechanism, the combination of a driving shaft, a driven shaft, friction wheels on said shafts, an interposed rotatable ball member through which rotation is imparted from one shaft to the other at certain times, a clutch for connecting the shafts directly together at other times, a hand lever with connecting means for shifting the ball member to change the speed, and for operating the clutch, and a foot lever with connecting mechanism for withdrawing the ball member from frictional engagement and for throwing the clutch out of operation.

CARL J. MELLIN.

Witnesses:
J. T. LONG,
ALEX. THAYER.